Sept. 18, 1951  J. D. MAXWELL  2,568,505
CONTACT SCREEN HALFTONE CAMERA

Filed Nov. 13, 1948  2 Sheets-Sheet 1

INVENTOR.
JOHN D. MAXWELL
BY
Morgan, Finnegan & Durham
ATTORNEYS.

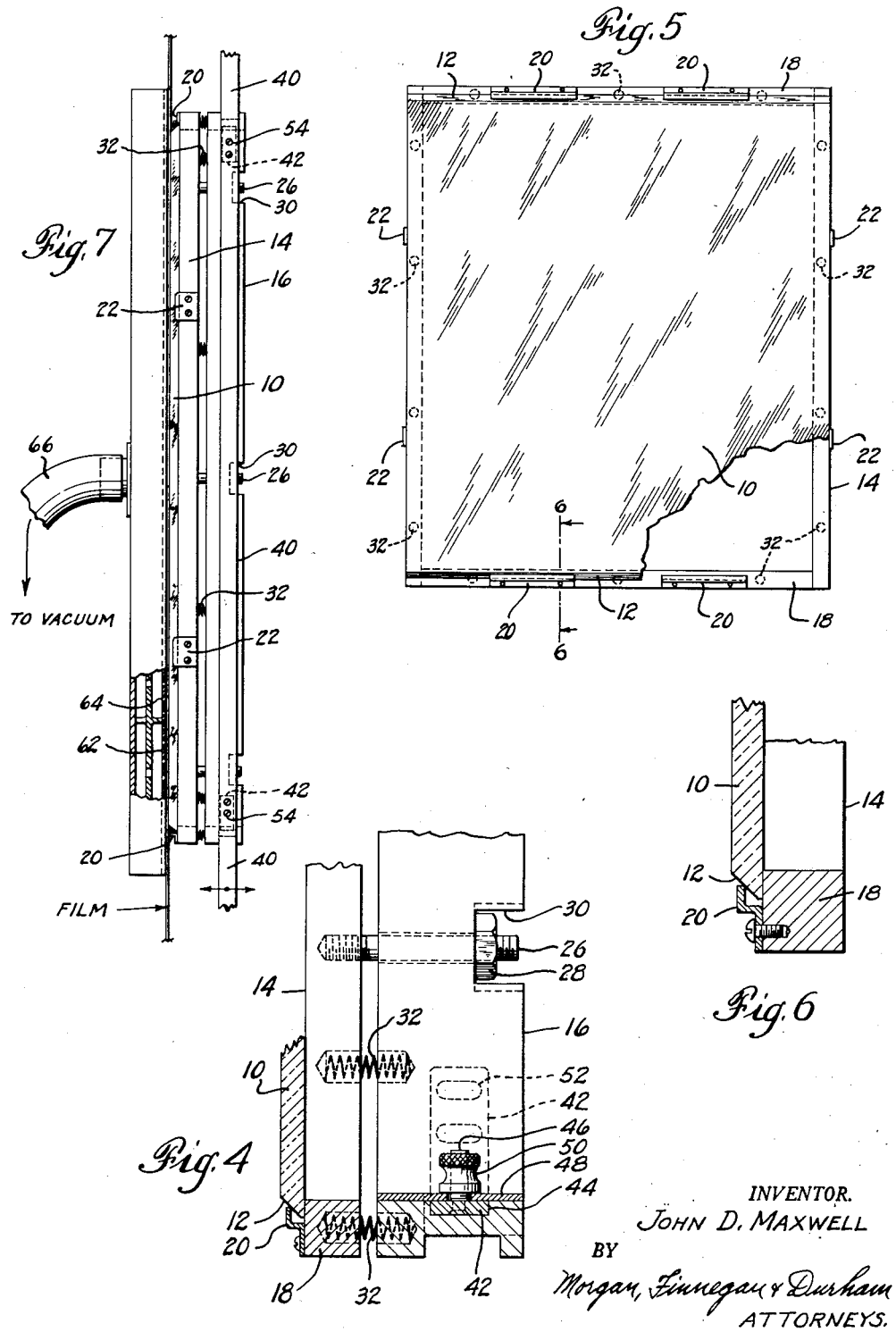

Patented Sept. 18, 1951

2,568,505

UNITED STATES PATENT OFFICE 2,568,505

CONTACT SCREEN HALFTONE CAMERA

John D. Maxwell, Glen Head, N. Y., assignor to Powers Photo Engraving Company, Glen Cove, N. Y., a corporation of New York Application November 13, 1948, Serial No. 59,873

2 Claims. (Cl. 95—81)

The present invention relates to a novel and improved camera for photoengraving according to the contact screen halftone process.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 4 is another fragmentary sectional view taken on the line 4—4 of Figure 1;

Figure 5 is a side elevation taken from the opposite side of Figure 1;

Figure 6 is a fragmentary detailed sectional view taken on the line 6—6 of Figure 5; and Figure 7 is a schematic side elevation, with parts broken away and others shown in section of the preferred and illustrative embodiment of the invention.

Figure 1:
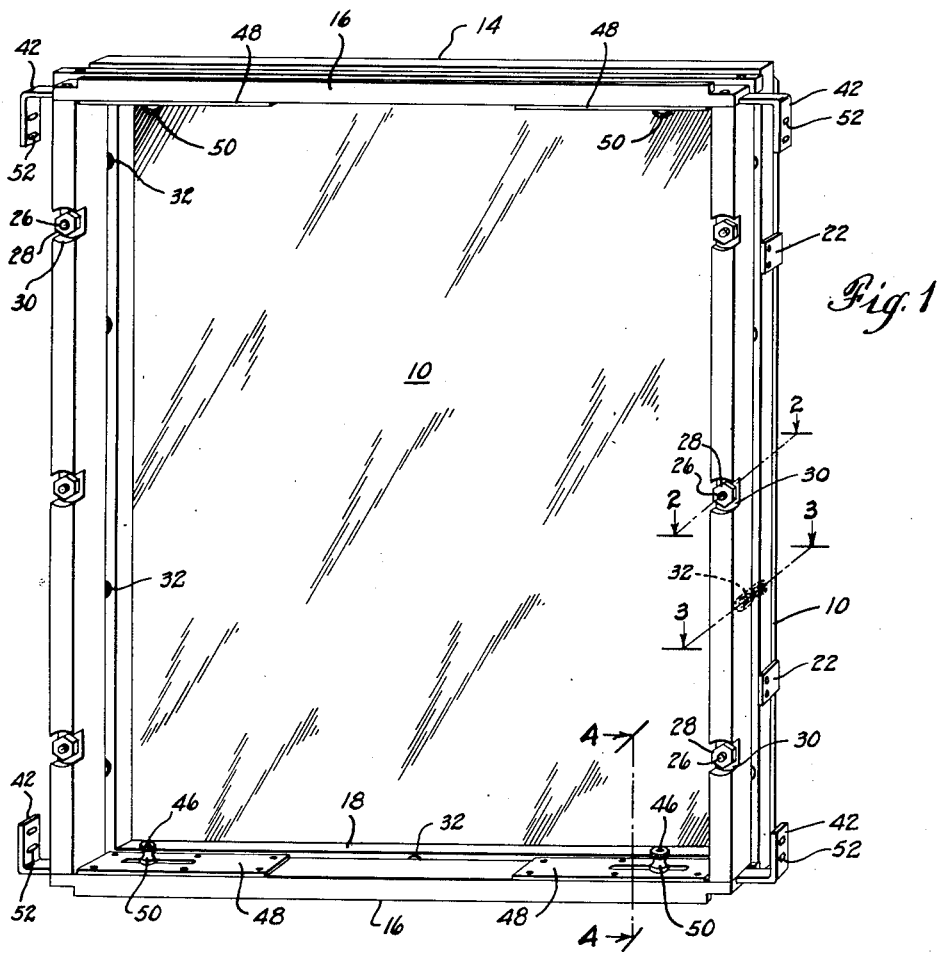
Figure 1 is a general perspective view of a contact screen holder and the contact screen according to the preferred and illustrative embodiment of the present invention.
Figure 2:
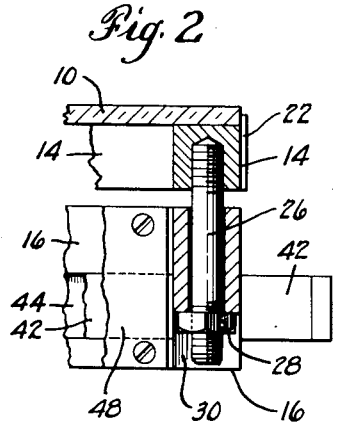
Figure 2 is a fragmentary sectional view taken on the line 2—2 of Figure 1.
Figure 3:
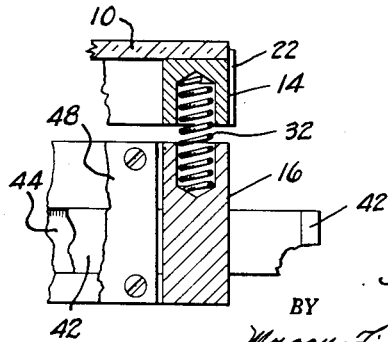
Figure 3 is a fragmentary sectional view taken on the line 3—3 of Figure 1.

The present invention has for its object the provision of a novel and improved screen holding and supporting mechanism for use with photoengraving cameras and particularly those using contact screens. The invention further provides a support for a contact screen whereby the screen may be pressed by fluid pressure against the sensitized material which in turn is held against a flat backing board so that the sensitized material is accurately held in the focal plane of the camera. The invention further provides a contact screen holding mechanism, particularly adapted for use with a vacuum back, which mechanism may be substituted for the conventional screen holding mechanism of a photoengraving camera without change.

According to the preferred form of the present invention, there is provided a frame having members to engage the rails which are movable axially of the lens so that the frame may be moved axially into and out of contact with the sensitized material to be exposed. Preferably the frame is provided with such members as to enable it to be secured to standard rails, although the frames may be of various sizes. There is also provided a second frame of a similar and equal size and shape on which is supported a contact screen on the side of the frame away from the first frame, the two frames being held parallel to each other although movable towards and away from each other. To provide for this movement, one of the members is provided with parallel guides which cooperate with the other and means are provided for limiting the extent of the movement of the two members from each other as well as other means which resiliently urge the two members away from each other. In this manner, the two frames, one of which is supported by the camera rails moved parallel to the axis of the camera lens while the other is moved both with the rails and also when the rails are moved towards the vacuum back as it moves relatively to the rails. The means by which the contact screen are held to the movable frame permit the unobstructed contact of the screen with the sensitized material and by reason of the relatively small thickness of the material the contact of the screen with the vacuum back is not sufficiently impaired to prevent uniform pressure of the screen being exerted against the sensitized material and its vacuum back. These means are preferably such that the surface of the contact screen may be firmly and uniformly engaged with the surface of the sensitized material, and are illustratively embodied as a contact screen having bevelled edges which are secured to the frames by means of brackets which do not extend beyond the surface of the screen.

It will be understood that the foregoing general description and the following detailed description as well are exemplary and explanatory of the invention but are not restrictive thereof.

Referring now in detail to the illustrative embodiment of the present invention as shown in the accompanying drawings, there is provided a contact screen supported on a rectangular sheet of plate glass 10 having its upper and lower parallel edges bevelled, as at 12 so that the contact screen may be secured to and carried by one of two similar frames 14 and 16.

The frames 14 and 16 are preferably of identical size and shape, but of different thickness. Each frame 14 and 16 comprises rigid side members 18 which extend slightly beyond the edges of the glass 10, and provide an open area within them only slightly smaller than the glass 10. The rear edges of frame 14 preferably lie in a plane so that they will evenly engage the surface of the glass plate 10. Frame 14, at its upper and lower side members, is provided with pairs of clamping rails 20 screwed to the frame members 18, the rails being small enough not to project beyond the other face of the glass 10.

Side stops 22 are provided on the side frame members 24 so as to prevent excessive sideways shifting of the contact screen on its supporting frame.

Frames 14 and 16 are mounted for resilient, limited movement away from each other axially of the camera lens, the frames being supported perpendicularly to the axis. For guiding the frames in their relative movement and for limiting this movement, frame 14 is provided with a plurality of parallel studs 26. Studs 26 are threaded into frame 14 and pass through parallel holes in the frame 16. The other ends of studs 26 are threaded and provided with nuts 28 which are fitted in recesses 30 in the edge of frame 16, the several nuts 28 being so adjusted that the fully spaced position of frame 14 holds it parallel to frame 16. Frames 14 and 16 are provided with registering holes in which are compressed coil springs 32 tending to push the frames apart from each other as far as permitted by the studs 26.

Means are provided for mounting the frames 14 and 16 and the screen 10 perpendicular to the axis of the camera lens and for movement toward and from the lens, and toward and from a sheet of sensitized material to be exposed. As embodied, the frame 16 is adapted to be supported on the movable, parallel screen supporting rails of a "Chemco" vacuum back halftone camera. These rails 40 are parallel to each other, vertical and perpendicular to the axis of the camera lens and provide for a sufficient movement to bring the contact screen 10 into contact with the sensitized material as it is supported on the backing member, later to be described.

In order to removably mount the screen 10 and frames 14 and 16 on the rails 40, an angle bracket 42 is slidably mounted at each corner of the frame 16, the brackets 42 projecting sideways towards one or the other of the rails 40. Each bracket 42 is slidable in a recessed slot 44 in a top or bottom frame member, and is provided with a set screw 46 projecting through a slot in a cover plate 48 so that a nut 50 may secure the bracket in the desired position. At its outer end, each bracket 42 is provided with slots 52 by which it may be fastened to screws 54 supported by the rails 40.

The support for the sensitized film or paper to be exposed comprises a backing member 62 which is formed as a hollow chest having one side provided with a large number of somewhat uniformly distributed small holes 64 communicating with a vacuum hose 66 connected to a suction pump of sufficient capacity to provide a forceful suction on each of the many holes 64 even when a large number of them may be not covered by the sensitized film to be exposed. Thus the flexible film or paper may be firmly held to the surface of the backing member and thus held in a flat plane perpendicular to the axis of the camera lens so that all parts of the film or paper are in the proper focal plane.

In the well-known form of "Chemco" vacuum-back halftone camera, the suction applied through the holes 64 serves to hold the film against the backing member and in firm contact therewith, while according to the present invention, the flow of air through the uncovered holes 64 is not only reduced but the suction also serves to draw the contact screen into firm, forceful and uniform contact with the film or paper to be exposed.

The screen 10 is initially pressed lightly against the film or paper by springs 32 and thus brought close to the backing member 62, being spaced therefrom by only the slight thickness of the film or paper. When the suction is applied, the screen is forced back into powerful contact with the film, holding the screen 10 in firm contact with the film and the film flat against the back 62.

When the exposure is complete, the suction is discontinued and the screen 10 is moved towards the lens by movement of the rails 40, thereby permitting the sensitized film or paper to be removed and replaced with another sheet.

The invention in its broader aspects is not limited to the specific mechanisms shown and described but departures may be made therefrom within the scope of the accompanying claims without departing from the principles of the invention and without sacrificing its chief advantages.

What is claimed is:

1. In a photoengraving camera apparatus, including a camera lens, camera rails, and a backing member over which a sheet of sensitized material may be moved and on which it may be held for exposure, the combination of two parallel frames of substantially equal size and shape, each positioned in the optical axis between the lens and the backing member, the plane of each frame being perpendicular with said optical axis, means cooperating with one of said frames and said camera rails for positioning that frame in said perpendicular plane, one of said frame members being provided with guide members extending parallel to said optical axis and cooperating with the other frame for relative movement to and away from one another along the optical axis, whereby said frames are always maintained in a proper parallel relation to one another, resilient means for urging said frames away from one another along said guides, stop means for limiting the movement of said frames away from one another, said frames being movable together along the optical axis without varying their positions relative to one another, and contact screen mounted in the frame adjacent said backing member.

2. In a photoengraving camera apparatus, including a camera lens, camera rails, and a backing member over which a sheet of sensitized material may be moved and on which it may be held for exposure, the combination of two parallel frames of substantially equal size and shape, each positioned in the optical axis between the lens and the backing member, the plane of each frame being perpendicular with said optical axis, means cooperating with one of said frames and said camera rails for positioning that frame in said perpendicular plane, one of said frame members being provided with guide members extending parallel to said optical axis and cooperating with the other frame for relative movement to and away from one another along the optical axis, whereby said frames are always maintained in a proper parallel relation to one another, resilient means for urging said frames away from one another along said guides, stop means for limiting the movement of said frames away from one another, said frames being movable together along the optical axis without varying their positions relative to one another, a contact screen mounted in the frame adjacent said backing member, and vacuum means acting on a portion of said backing member not covered by said sensitized film, said resilient means acting to press said contact screen lightly against said sensitized film, and said vacuum means acting to force said contact screen into powerful contact with the film flat against the backing member.

JOHN D. MAXWELL.

REFERENCES CITED

The following references are of record in the file of this patent:

UNITED STATES PATENTS

| Number | Name | Date |
|---|---|---|
| 688,080 | Flora | Dec. 3, 1901 |
| 851,593 | Hatt | Apr. 23, 1907 |
| 1,347,824 | Pifer | July 27, 1920 |
| 2,126,479 | Landrock | Aug. 7, 1938 |
| 2,473,023 | Gelb | June 14, 1949 |